(12) United States Patent
Ziebell

(10) Patent No.: US 11,405,368 B2
(45) Date of Patent: Aug. 2, 2022

(54) SYSTEMS, METHODS, AND MEDIA FOR A CLOUD BASED SOCIAL MEDIA NETWORK

(71) Applicant: William J. Ziebell, Eagle, ID (US)

(72) Inventor: William J. Ziebell, Eagle, ID (US)

(73) Assignee: William J. Ziebell, Eagle, ID (US)

(*) Notice: Subject to any disclaimer, the term of this patent is extended or adjusted under 35 U.S.C. 154(b) by 360 days.

(21) Appl. No.: 16/361,121

(22) Filed: Mar. 21, 2019

(65) Prior Publication Data

US 2019/0222562 A1 Jul. 18, 2019

Related U.S. Application Data

(63) Continuation of application No. 14/936,606, filed on Nov. 9, 2015, now Pat. No. 10,298,547.
(Continued)

(51) Int. Cl.
*H04L 29/06* (2006.01)
*H04L 9/40* (2022.01)
*H04L 67/1097* (2022.01)
*H04L 67/306* (2022.01)
*G06F 21/62* (2013.01)
(Continued)

(52) U.S. Cl.
CPC .......... *H04L 63/0428* (2013.01); *G06F 21/62* (2013.01); *G06Q 50/01* (2013.01); *H04L 51/32* (2013.01); *H04L 63/104* (2013.01); *H04L 67/1097* (2013.01); *H04L 67/2814* (2013.01); *H04L 67/306* (2013.01)

(58) Field of Classification Search
CPC ... H04L 63/0428; H04L 51/32; H04L 63/104; H04L 67/1097; H04L 67/2814; H04L 67/306; G06F 21/62; G06Q 50/01
See application file for complete search history.

(56) References Cited

U.S. PATENT DOCUMENTS 7,730,216 B1* 6/2010 Issa .................... H04L 67/104 709/250
7,886,000 B1* 2/2011 Polis ................... H04L 67/2833 709/203

(Continued)

OTHER PUBLICATIONS

Baran, Paul, "On Distributed Communications Networks." No. P-2626. Rand Corp Santa Monica Calif, 1962, 41 pages.
(Continued)

*Primary Examiner* — James R Turchen
(74) *Attorney, Agent, or Firm* — Loyal IP Law, PLLC; Travis Banta

(57) ABSTRACT

System and methods for providing private social networks, which are cloud-based in some instances, are provided herein. A method includes receiving a selection of the digital data on a private user secure data storage device from a first user, receiving a selection of one or more individuals to be given access to the digital data, applying access rights for the digital data, creating a URL that points to a location within the private user secure data storage device where the digital data resides, posting the URL to a plurality of social networks using a shared message, receiving a request from a second user for the digital data when the second user clicks the URL in the shared message, and serving the digital data to the second user directly from the private user secure data storage device without storing the digital data on any of the plurality of social networks.

6 Claims, 17 Drawing Sheets

Related U.S. Application Data

(60) Provisional application No. 62/080,136, filed on Nov. 14, 2014.

(51) Int. Cl.
*G06Q 50/00* (2012.01)
*H04L 51/52* (2022.01)
*H04L 67/563* (2022.01)

(56) References Cited

U.S. PATENT DOCUMENTS

| | | | | |
|---|---|---|---|---|
| 8,370,062 | B1* | 2/2013 | Starenky | G06Q 30/0261 |
| | | | | 701/467 |
| 8,732,853 | B1* | 5/2014 | Byrne | H04L 63/08 |
| | | | | 726/28 |
| 9,075,954 | B2* | 7/2015 | Kirigin | G06F 16/178 |
| 9,112,936 | B1* | 8/2015 | Poletto | H04L 29/08117 |
| 9,135,664 | B2* | 9/2015 | Grassel | G06Q 10/101 |
| 9,166,936 | B1* | 10/2015 | Stovall | H04L 51/063 |
| 9,317,807 | B1* | 4/2016 | Staddon | H04L 51/32 |
| 9,325,571 | B2* | 4/2016 | Chen | G06F 9/468 |
| 9,467,531 | B1* | 10/2016 | Holden | H04L 67/10 |
| 9,633,125 | B1* | 4/2017 | Garcia | G06F 3/0482 |
| 9,654,551 | B2* | 5/2017 | Vyrros | A63F 13/795 |
| 9,817,987 | B2* | 11/2017 | Mityagin | H04L 67/1095 |
| 9,858,298 | B1* | 1/2018 | Barak | G06F 16/27 |
| 2004/0070678 | A1* | 4/2004 | Toyama | H04N 1/00172 |
| | | | | 348/231.3 |
| 2007/0255807 | A1* | 11/2007 | Hayashi | G06Q 10/107 |
| | | | | 709/219 |
| 2008/0222199 | A1* | 9/2008 | Tiu | G06F 40/143 |
| 2009/0070684 | A1* | 3/2009 | Aldrich | G06F 16/986 |
| | | | | 715/743 |
| 2009/0300502 | A1* | 12/2009 | Johnson | G06Q 10/00 |
| | | | | 715/733 |
| 2012/0023332 | A1* | 1/2012 | Gorodyansky | H04L 63/105 |
| | | | | 713/168 |
| 2012/0131683 | A1* | 5/2012 | Nassar | H04L 67/10 |
| | | | | 726/28 |
| 2012/0137367 | A1* | 5/2012 | Dupont | G06F 21/00 |
| | | | | 726/25 |
| 2012/0197785 | A1* | 8/2012 | Cooper | G06Q 10/101 |
| | | | | 705/39 |
| 2012/0203733 | A1* | 8/2012 | Zhang | G06Q 50/01 |
| | | | | 707/600 |
| 2012/0222135 | A1* | 8/2012 | Chavez | H04N 21/4104 |
| | | | | 726/29 |
| 2012/0331108 | A1* | 12/2012 | Ferdowsi | 709/219 |
| 2013/0036171 | A1* | 2/2013 | Gilbert | G06Q 50/01 |
| | | | | 709/204 |
| 2013/0073970 | A1* | 3/2013 | Piantino | G06F 3/0481 |
| | | | | 715/738 |
| 2013/0254259 | A1* | 9/2013 | Wilson | G06F 16/972 |
| | | | | 709/203 |
| 2013/0290426 | A1* | 10/2013 | Sorensen | H04L 51/32 |
| | | | | 709/204 |
| 2013/0328932 | A1* | 12/2013 | Kim | H04L 29/08549 |
| | | | | 345/636 |
| 2013/0332523 | A1* | 12/2013 | Luu | G06Q 30/0269 |
| | | | | 709/204 |
| 2014/0006930 | A1* | 1/2014 | Hollis | G06F 16/951 |
| | | | | 715/234 |
| 2014/0053228 | A1* | 2/2014 | Mahadevan | G06F 16/176 |
| | | | | 726/1 |
| 2014/0067929 | A1* | 3/2014 | Kirigin | H04L 67/06 |
| | | | | 709/204 |
| 2014/0108621 | A1* | 4/2014 | Bryan | G06F 40/143 |
| | | | | 709/219 |
| 2014/0129627 | A1* | 5/2014 | Baldwin | G06Q 10/10 |
| | | | | 709/204 |
| 2014/0195609 | A1* | 7/2014 | Wise | H04L 51/32 |
| | | | | 709/204 |
| 2014/0215551 | A1* | 7/2014 | Allain | H04L 63/104 |
| | | | | 726/1 |
| 2014/0258418 | A1* | 9/2014 | Subramani | H04L 67/1095 |
| | | | | 709/205 |
| 2014/0280180 | A1* | 9/2014 | Edecker | G06F 16/9535 |
| | | | | 707/740 |
| 2014/0282016 | A1* | 9/2014 | Hosier, Jr. | H04W 4/08 |
| | | | | 715/733 |
| 2014/0282901 | A1* | 9/2014 | Dwan | H04L 67/22 |
| | | | | 726/4 |
| 2014/0283138 | A1* | 9/2014 | Hochberg | H04L 63/083 |
| | | | | 726/30 |
| 2015/0058957 | A1* | 2/2015 | Halliday | H04L 51/32 |
| | | | | 726/7 |
| 2015/0134751 | A1* | 5/2015 | Meyers, Jr. | H04L 51/08 |
| | | | | 709/206 |
| 2015/0149410 | A1* | 5/2015 | Haon | G06F 16/48 |
| | | | | 707/627 |
| 2015/0149930 | A1* | 5/2015 | Walkin | G06F 3/04883 |
| | | | | 715/753 |
| 2015/0180980 | A1* | 6/2015 | Welinder | H04L 67/06 |
| | | | | 715/758 |
| 2015/0180984 | A1* | 6/2015 | Poletto | H04L 67/1095 |
| | | | | 709/203 |
| 2015/0222580 | A1* | 8/2015 | Grue | H04L 67/1095 |
| | | | | 709/206 |
| 2015/0324386 | A1* | 11/2015 | Calder | H04L 67/1097 |
| | | | | 707/649 |
| 2015/0350106 | A1* | 12/2015 | Whalley | H04L 67/20 |
| | | | | 709/225 |
| 2016/0062483 | A1* | 3/2016 | Baldwin | G06Q 20/20 |
| | | | | 345/156 |
| 2016/0103801 | A1* | 4/2016 | Bortz | G06F 40/134 |
| | | | | 715/205 |
| 2016/0105388 | A1* | 4/2016 | Bin Mahfooz | H04N 5/232933 |
| | | | | 709/206 |
| 2016/0105526 | A1* | 4/2016 | Kritt | H04L 67/06 |
| | | | | 709/204 |
| 2016/0321459 | A1* | 11/2016 | Byszio | H04L 63/0471 |

OTHER PUBLICATIONS

Weinstein, Elizabeth Potts; "Who Owns your Content? What You Give Away When You Post Stuff Online"; Oct. 14, 2012; https://web.archive.org/web/20121018023727/http://www.elizabethpottsweinstein.com/owns/ (Year: 2012).

Henry, Alan; "Google vs Dropbox: Which is Better for Hosting and Sharing Photos?"; Dec. 26, 2013; Lifehacker (year 2013).

Kiwitz, Andre; How to Use Google+ Photos (And Moving From Picasa to Google+Photos), The Ultimate Guide; Jan. 31, 2014; https://www.trip.me/blog/moving-photos-picasa-google-plus/ (Year: 2014).

Martonik, Andrew; "Managing Your Shared Photo Links in Google Photos"; Jun. 8, 2015; https://www.androidcentral.com/managing-your-shared-photo-links-google-photos (Year: 2015).

* cited by examiner

SYSTEMS, METHODS, AND MEDIA FOR A CLOUD BASED SOCIAL MEDIA NETWORK

CROSS REFERENCE TO RELATED APPLICATIONS

This application is a continuation of and claims the benefit and priority of U.S. application Ser. No. 14/936,606, filed on Nov. 9, 2015, which claims the benefit and priority of U.S. Provisional Application Ser. No. 62/080,136, filed on Nov. 14, 2014. The aforementioned disclosures are hereby incorporated by reference herein in their entirety including all references and appendices cited and incorporated by reference therein.

FIELD OF THE INVENTION

The present disclosure is directed to systems and methods for cloud-based social media networks. Some embodiments enable users to securely share their digital data with third parties such that the digital data is served from a privately maintained cloud or storage area. Users can share their digital data without losing control and ownership thereof to third parties. The systems and methods enable aggregation of public social network feeds into a private social network platform.

SUMMARY

According to some embodiments, the present disclosure is directed to a method, comprising: (a) receiving a selection of the digital data on a secure data storage device; (b) associating text entered by a user with the digital data; (c) associating one or more individuals with the digital data using a tag; (d) receiving a selection of a geographical location to associate with the digital data; (e) receiving a selection of one or more individuals to access the digital data; (f) setting the privacy of the digital data; (g) setting the rights of one or more individuals to the digital data, determining by an application the rights of the one or more individuals to the digital data; (h) determining an expiration of the digital data; (i) encrypting the digital data; (j) generating encryption keys by the application; (k) encrypting by the application the digital data; (l) saving by the application the digital data to a user's secure data storage; (m) creating a URL by the application to the digital data; and (n) posting by the application the URL to the digital data, identifiers for the one or more selected individuals and encryption keys for the one or more selected individuals to a shared server.

According to some embodiments, the present disclosure is directed to a method, comprising: (a) receiving a selection of the digital data on a private user secure data storage device from a first user; (b) receiving a selection of one or more individuals to be given access to the digital data; (c) applying access rights for the digital data; (d) creating a URL by the application to the digital data; (e) posting by the application the URL to a plurality of social networks; (f) receiving a request from a second user for the digital data when the second user clicks the URL; and (g) serving the digital data to the second user directly from the private user secure data storage device without storing the digital data on any of the plurality of social networks.

According to some embodiments, the present disclosure is directed to a method, comprising: (a) providing an account link user interface that allows a user to link a plurality of private cloud storage accounts for a single user; (b) providing an account login user interface that allows a user to log into a plurality of social network accounts for the single user; (c) aggregating feeds for the plurality of social network accounts for the single user into an aggregated social network; (d) creating a contact group for the single user; (e) searching the plurality of social network accounts for contacts within the contact group; (f) creating a URL for digital data owned by the single user, the digital data being stored on at least one of the plurality of private cloud storage accounts; and (g) sharing the URL with at least a portion of the contacts of the contact group.

BRIEF DESCRIPTION OF THE DRAWINGS

The accompanying drawings, where like reference numerals refer to identical or functionally similar elements throughout the separate views, together with the detailed description below, are incorporated in and form part of the specification, and serve to further illustrate embodiments of concepts that include the claimed disclosure, and explain various principles and advantages of those embodiments.

The methods and systems disclosed herein have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Figure 1:
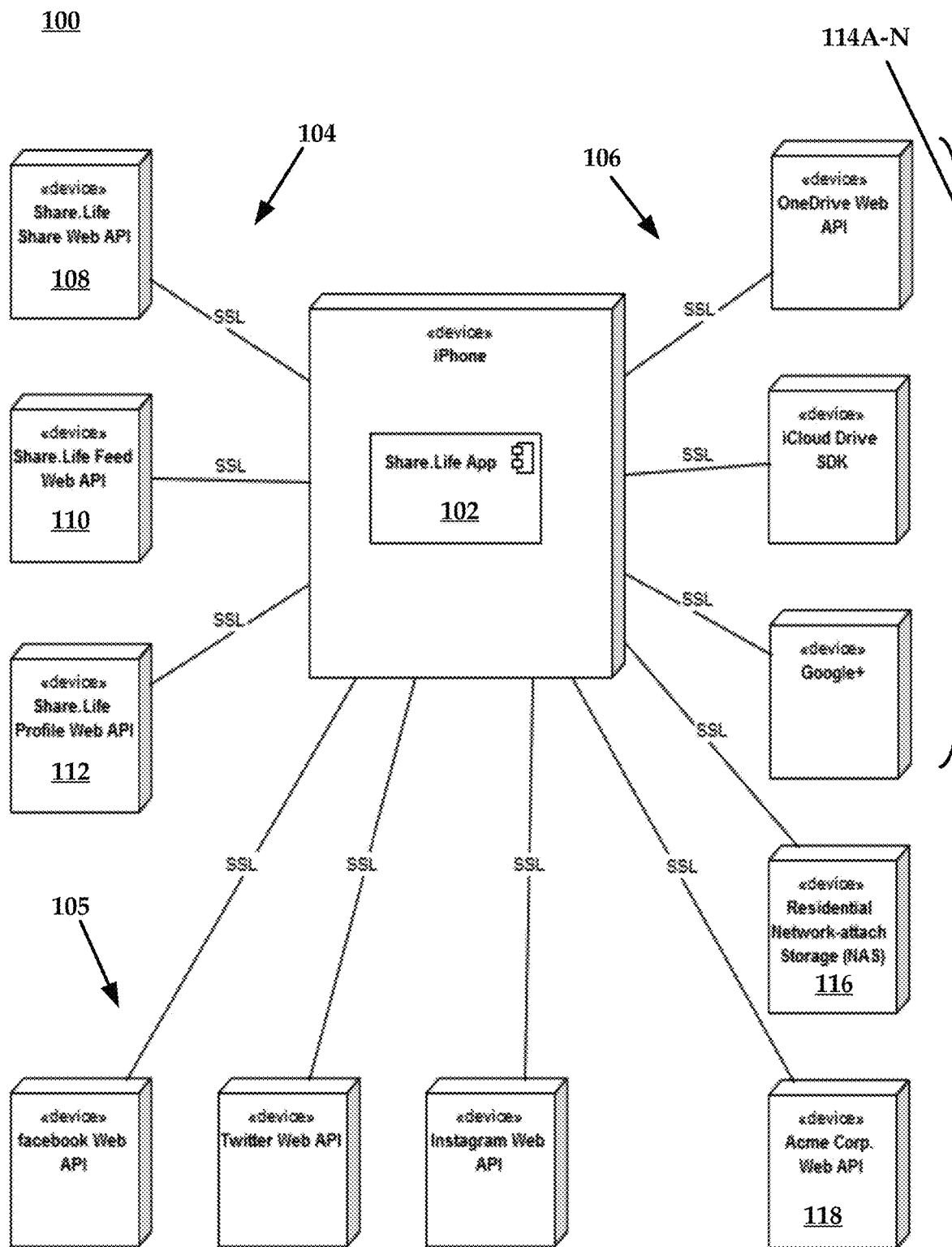
FIG. 1 is a schematic diagram of an example private/aggregate social network system, constructed in accordance with the present disclosure.

For context, in the existing social media paradigm, users utilize free, ad-based apps such as Facebook™, Twitter™, Instagram™, and Linked-In™ to push content (e.g., digital data) out via posts. The content is transferred to a data center which is owned and controlled by the respective social media networks and then pulled back into a user's smart device via feeds. The problem with this model is that once the content is pushed out via posts and stored in a remote data center, users lose ownership of the content and risk the malicious misuse of their shared digital data.

Users are typically not allowed to delete their content because the content resides on the social network's data center. Users also relinquish the ability to set and maintain access and distribution to their content. Users do not have control of the feeds that are being returned, or the ability to effectively monitor them. Users have limited exposure to what is actually being posted by friends, followers, connections, and so forth. Also, users cannot aggregate feeds from a plurality of different social networks in a collocated application or service.

Additionally, these social networks can sometimes adopt a user's content for their advertising purposes, collect, and sell data about the user and their usage, and serve the user only the content that the social network providers think will help sell paid advertisers' products.

Social media network have faced criticism for their privacy settings, ownership rights, and advertising practices. This has caused user concern for their privacy and safety with respect to recent reports of online trolling, where people are stealing social identities and abusing them; as well as data breaches, where thousands of "deleted" images have been stolen and released.

Systems and methods of the present disclosure remedies the deficiencies of social media content being stored and transmitted using remote data centers, where the user loses control of their digital data. Instead, the present technology leverages a Federated Cloud Drive System™ to allow users to share content that already exists on their personal cloud drives or other data storage devices such residential network, attached storage (NAS) or business storage servers that implement cloud storage web APIs. These are all generally referred to as private user secure data storage or a secure data storage device.

Rather than posting digital data onto a social network, where storage of the digital data by the social network can occur, the present technology allows a user to store their digital data in a secure and controlled location as mentioned above. Rather than uploading or posting the digital content to the social network, the present technology generates and transmits hyperlinks, instead of the digital data. Thus, users maintain total ownership of their content. Users can add content with ease and they can also delete with ease, with absolutely no risk of the data living on. To be sure, the present technology leverages the private storage devices or cloud storage of the user, rather than requiring the user to expose their digital data for unsecured and uncontrolled storage.

These systems and methods ensure a high level of security, providing the user with the ability to assign access rights (Federated Access Control System™) as well as encrypt data at rest and in transit (Federated Encryption System™), sharing is guaranteed to be as private and secure as users desire and specify.

Users maintain total control of their feeds. Unique grouping functionality enables users to define what they share, who they share it with, as well as what they see and who they see it from. In some embodiments, the present technology employs a subscription based service; there is no advertising, no data mining, and no manipulation or limitation of user feeds to promote products.

Users also have new monitoring and sharing capabilities across multiple public social media networks. The present disclosure provides a Federated Public Social Media System™ that aggregates posts and feeds from multiple public social media networks. Users get to personalize how much they want to view and who they want to view it from, without any advertising or filters, as well as monitor activity across multiple accounts. So a parent, for example, can use the systems and methods of the present disclosure to monitor the content being generated and consumed by multiple children on multiple public social media networks as well as share privately or publicly with them all from one centralized location.

The present disclosure is a gateway solution that brings existing public social media networks as well as the new private social media network together into one solution. The present disclosure allows users to choose a personalized level of ownership, privacy, control, and monitoring of their social media presence, thereby addressing many of the concerns and criticisms about social media in a very unique and compelling way. All of this is possible with a mobile application supported by the aforementioned Federated Cloud Services.

The Federated Cloud Services of the present disclosure, in combination with the mobile application, enables interoperability and information sharing between autonomous and decentralized systems to create a greatly enhanced social media experience based on a massively distributed and secure system.

FIG. 1 illustrates the logical systems architecture of a Federated Cloud Service (service 100) and application 102. The service 100 comprises private API servers 104, a third party APIs 105, and SDK components 106. The network connections between connected components are made over Secure Sockets Layer (SSL) connections or other similarly network connection protocols.

The service 100 comprises a share web API server 108 (shared message server), a feed web API server 110, and a profile web API server 112, that provide configuration, deployment and management provisioning services, as well as storage, notification, authorization, and authentication functions for the application 102 and users. The application 102 runs on a mobile device or computer and is the central component in the systems architecture as it is where most of the application logic resides. The application 102 integrates with the illustrated services, secure data storage APIs and SDKs, and public social media Web APIs.

This unique systems architecture approach creates significant real world efficiencies, including optimized storage space on our Web API servers, optimized available bandwidth over the network to authorized third parties, and optimized storage space and processing resources on third party devices.

Figure 2:
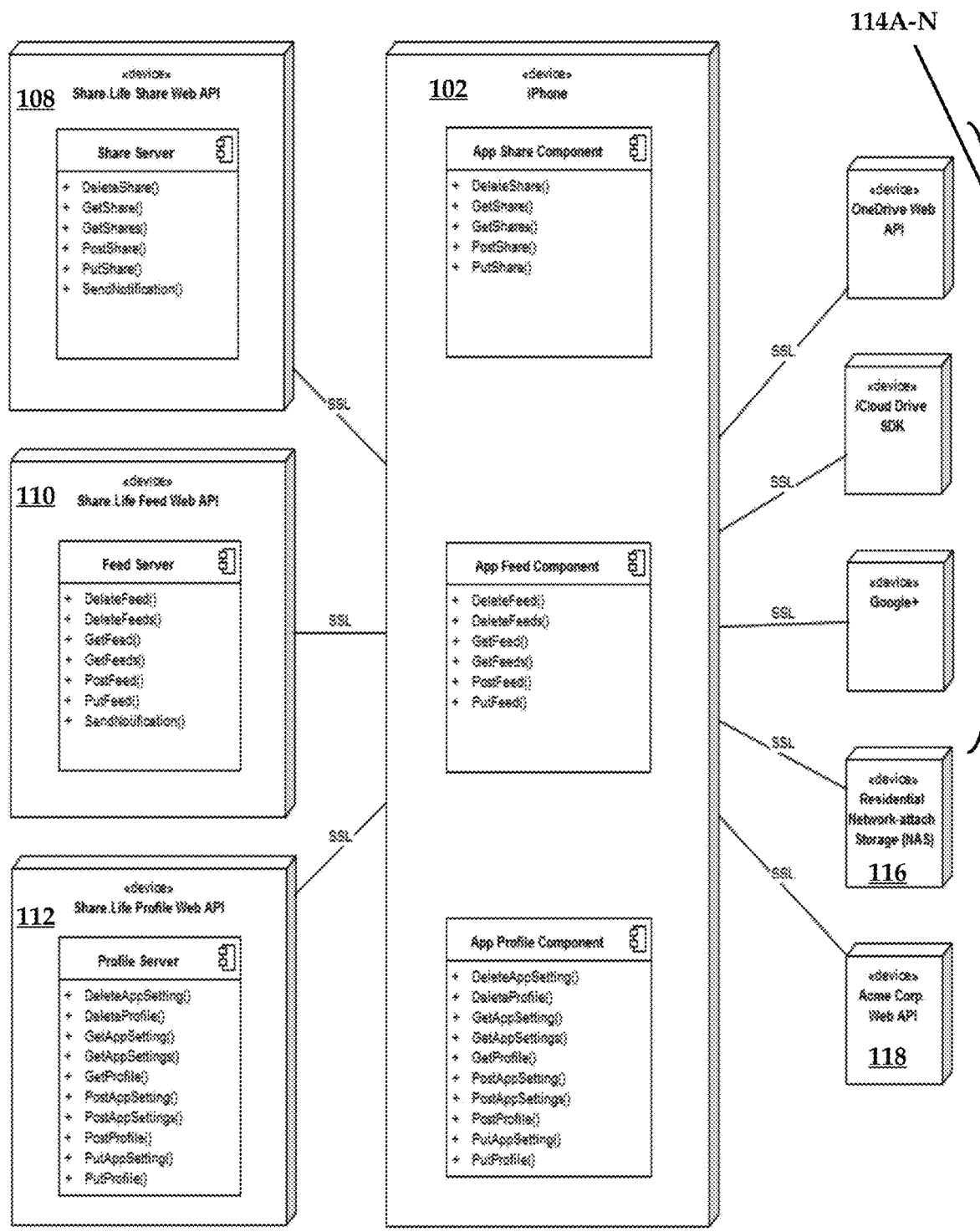
FIG. 2 is another schematic diagram of the example private/aggregate social network system, constructed in accordance with the present disclosure.

FIG. 2 illustrates the logical systems architecture of a private social media network. It depicts the plurality of Web API servers (108-112), the application 102, and several types of secure data storage systems (114A-N) and their relationships. The diagram also illustrates unique application layer specific functionality that includes sharing, feeds, and profile.

As noted previously, the existing social media paradigm is one in which users post content that originates directly from their device within a pubic social media application (e.g. Facebook™) or through an application that posts content from a storage device using public social media Graph APIs (e.g. OneDrive™ provides an ability to post drive content using the Facebook™ Graph API). Both approaches conclude with the same result being that the user's content is copied to the public social media data center whereupon the user loses control and ownership of their content.

In contrast, the systems architecture of FIGS. 1 and 2, in combination with its server and application software, enables a user to share content from a wide array of secure storage devices (e.g. private cloud, home NAS 116, or business secure storage 118), in the form of hypermedia. To be sure, hypermedia is generally defined as "an extension of the term hypertext, is a nonlinear medium of information which includes graphics, audio, video, plain text, and hyperlinks."

The present technology leverages hyperlinks to hypermedia stored on the user's secure storage devices (either local or remote). User content is never stored in a data center that is not controllable by the user; instead hyperlinks to hypermedia create a massively distributed and secure system.

Figure 3:
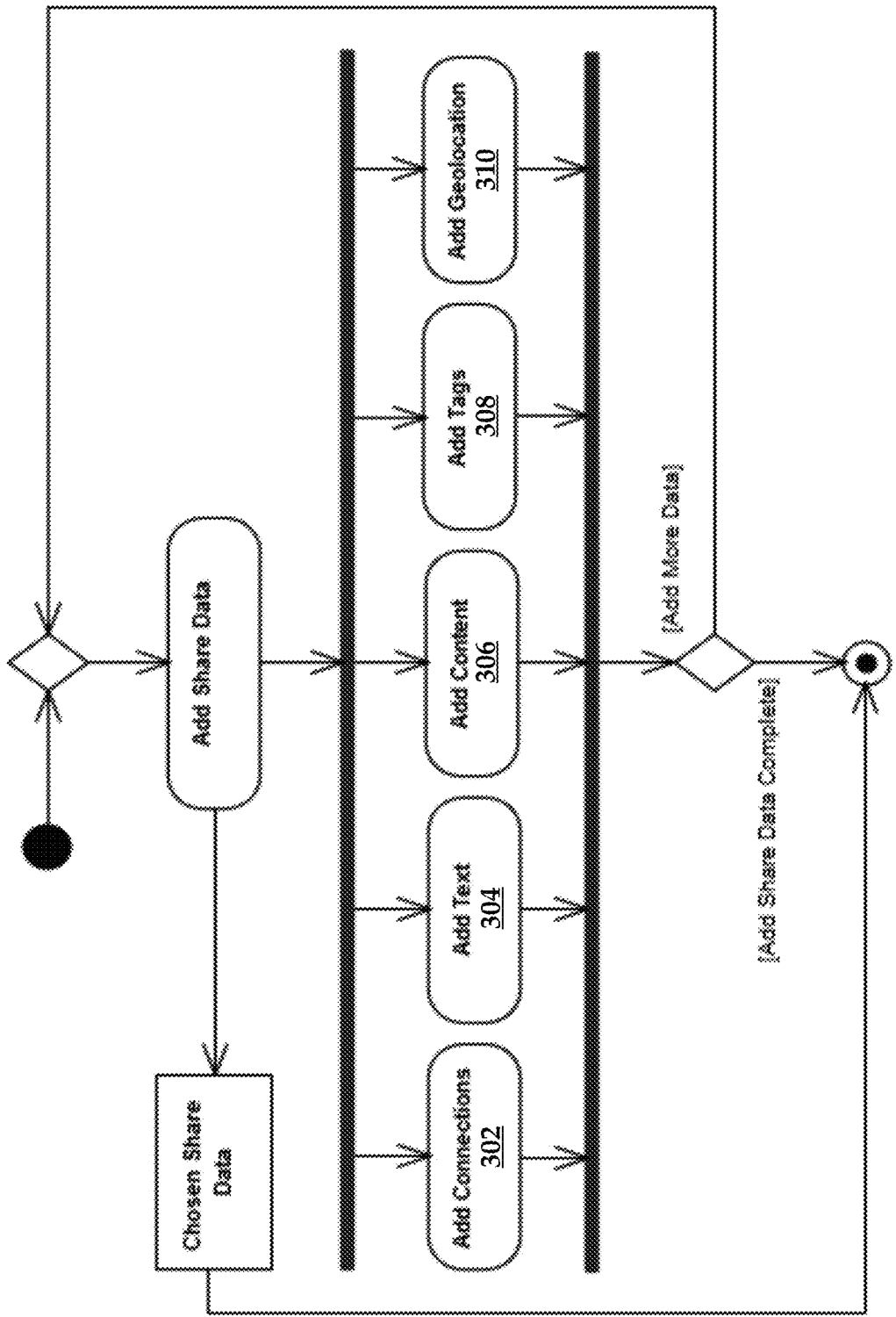
FIG. 3 is a flow diagram that specifies aspects of a shared message.

With the examples of logical architectures set forth above, the following paragraphs illustrate processes facilitated by these example logical architectures. FIG. 3 illustrates a create and share data activity diagram. The method details a user's actions to add connections, text, content, tags, and geolocation to a shared message, using various tools provided by the system. For example, the system provides an aggregated social network that provides an application that enables users to utilize groups to select connections as well as utilize a mapping functionality to attribute geolocation for a shared message.

In one embodiment, users can select multiple connections individually and/or can add connections by selecting multiple groups for a shared message in block 302. The application can generate a unique set of connections even if an individual connection is added that is also in a group.

In some embodiments, users can add emoticons in addition to the text of a shared message in block 304.

To be sure, any file type stored on a user's cloud drive can be selected and attached to a shared message in block 306. Users can also use the system to manage all their cloud content (e.g., edit, copy, delete, and move file functions) from within one application.

According to some embodiments, users can tag other connections for inclusion in a shared message in block 308. The tagging functionality can illustrate a connection's profile picture in addition to their profile name. The underlying implementation to accessing a connection's profile hypermedia is through the use of hyperlinks to a connection's text and photos stored on the user's secure data storage device.

Users can add a geolocation to the shared message by using the app to add geolocation data from either the device API or a mapping screen, where users can drop a pin to designate location for the shared message in block 310.

Figure 4:
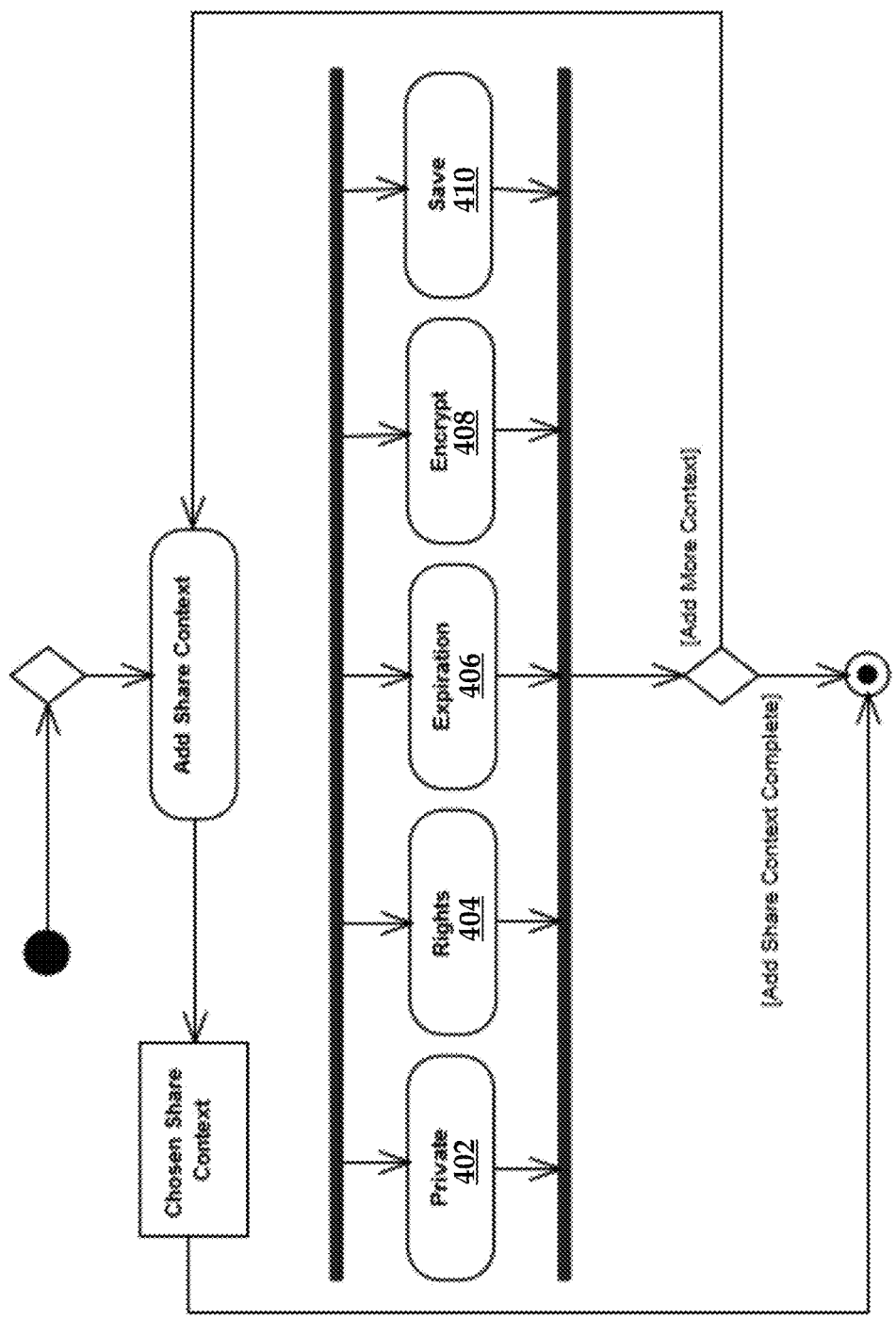
FIG. 4 is a flow diagram that specifies sharing aspects of a shared message.

FIG. 4 illustrates a create and share context activity diagram having share context settings (e.g., access rights) private, rights, expiration, encrypt, and save. The actions provide a robust set of functionality that enables the user to control their digital content that is referenced in a shared message using a URL.

Users can instruct the system and application to enable a privacy icon and collapse the shared message in a feed so that the viewer understands that the shared message is meant for their eyes only in block 402. Users can also set read, write, download, and/or invite rights to a shared message in block 404. The function set prompts users to disambiguate competing group rights depending on which connections and/or groups are selected to receive a shared message. Users can set a time to live that sets a countdown clock until the shared message is no longer available in block 406. Users can select extra encryption for their shared message, so that it is not only encrypted while in transit (the default for all shares), but also encrypted while at rest (when stored) in block 408. Users can also decide to save the shared message so they have the ability to retrieve it and complete it at a later time 410. The application will contain the ability to create a list of stored shared messages that can be easily accessed and seen.

When a user has completed creating a shared message, the user can actuate a send button to transmit the shared message to the aggregated social networks, or pushed to the plurality of individual social networks.

Actuating the send button can also trigger a functionality to save (block 410) and encrypt hypermedia (the digital data) as well as generate hyperlinks that are then sent to the share server (see FIGS. 1 and 2) in block 408. If the share encryption context is set to false, the encrypted aspects of the activity are still applied to content and hyperlinks associated with the hypermedia.

Figure 5:
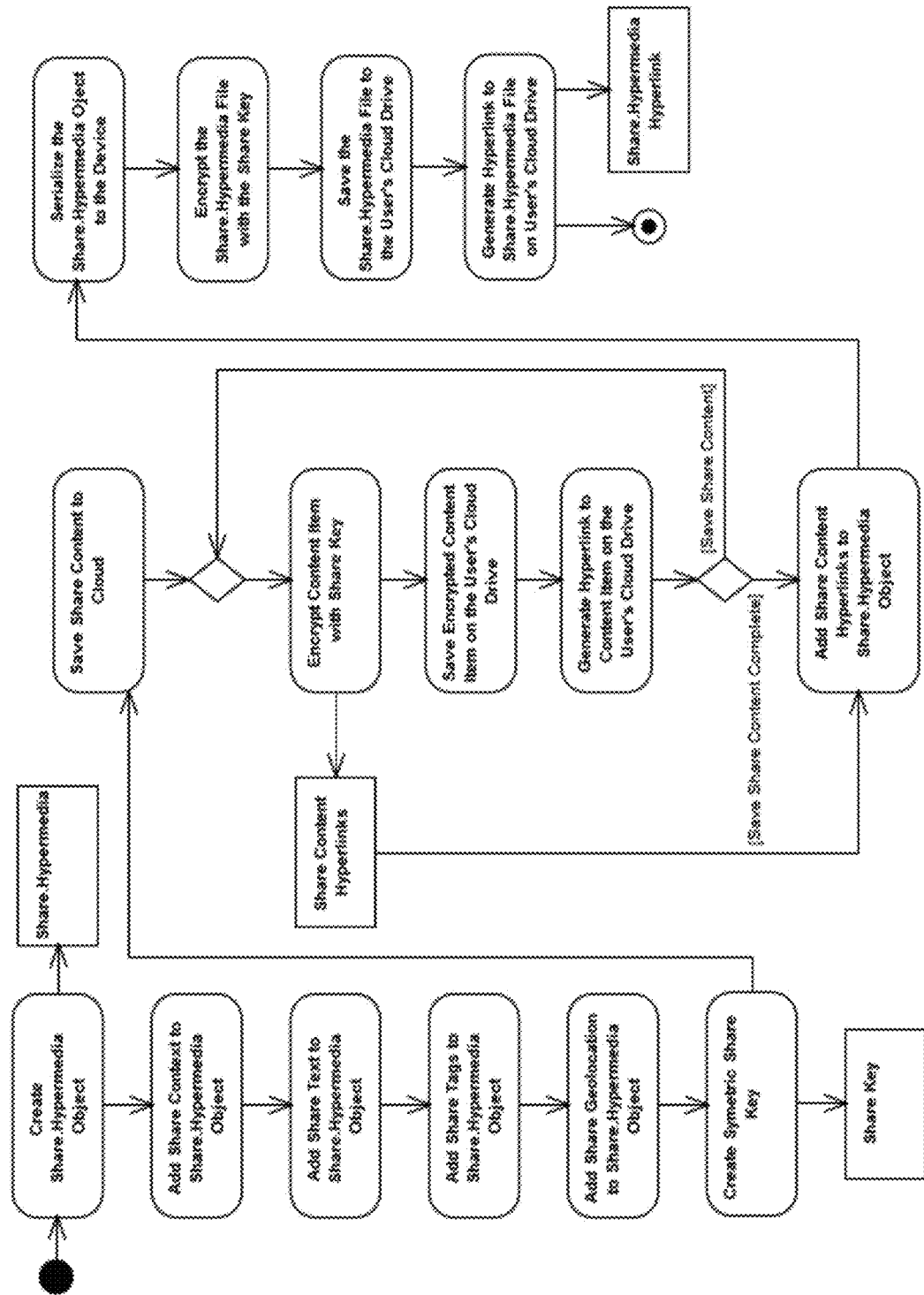
FIG. 5 is a flow diagram that illustrates a save and share message method.

The details of save and encrypt functions are outlined in FIG. 5, which illustrates a save and share message activity diagram. Send functions are detailed in FIG. 6, which illustrates a send share object to share server activity diagram. For context, the 'share.hypermedia' elements will be understood to include the digital data stored by the user in their personal storage space(s).

These diagrams illustrate how user controlled use of user owned digital data is actually implemented. Again, the systems allow for the transmission of a hyperlink that references the user's digital data. A list of connections receiving the shared message, which includes the hyperlink, and their respective encrypted share key for accessing the share data and context are also created.

Note that while content is encrypted and stored on a user's secure data storage device, not all shared data and context needs to be stored in the shared message file. It is possible for the system to transmit some of the share data and context to a back office to achieve efficiencies where limited device processing power and/or network bandwidth negatively impact application performance and user experience. Shared message data and context that is sent to the back office share servers is encrypted with the share key so that it is stored in an encrypted state.

The encryption share key for shared message data and context is unique for each shared message in the system. This feature, in combination with the massively distributed nature of the secure data storage, is a limiting factor in the attack surface area. While there is certainly the risk of a private asymmetric key being compromised, a hacker would only be able to access the shared message data and context for which the private key can be used to decrypt symmetric share keys. The attack surface area is further limited by the number of hyperlinks on a given user device.

Once the shared message is received by a server in the system, it is stored and processed. For each connection contained in the shared message object, the shared message server posts a copy of the shared message object to the connection's feed storage along with the connection's specific encrypted shared message key. After the feed is stored, the shared message server sends a notification to the connection indicating a new feed is available.

Figure 6:
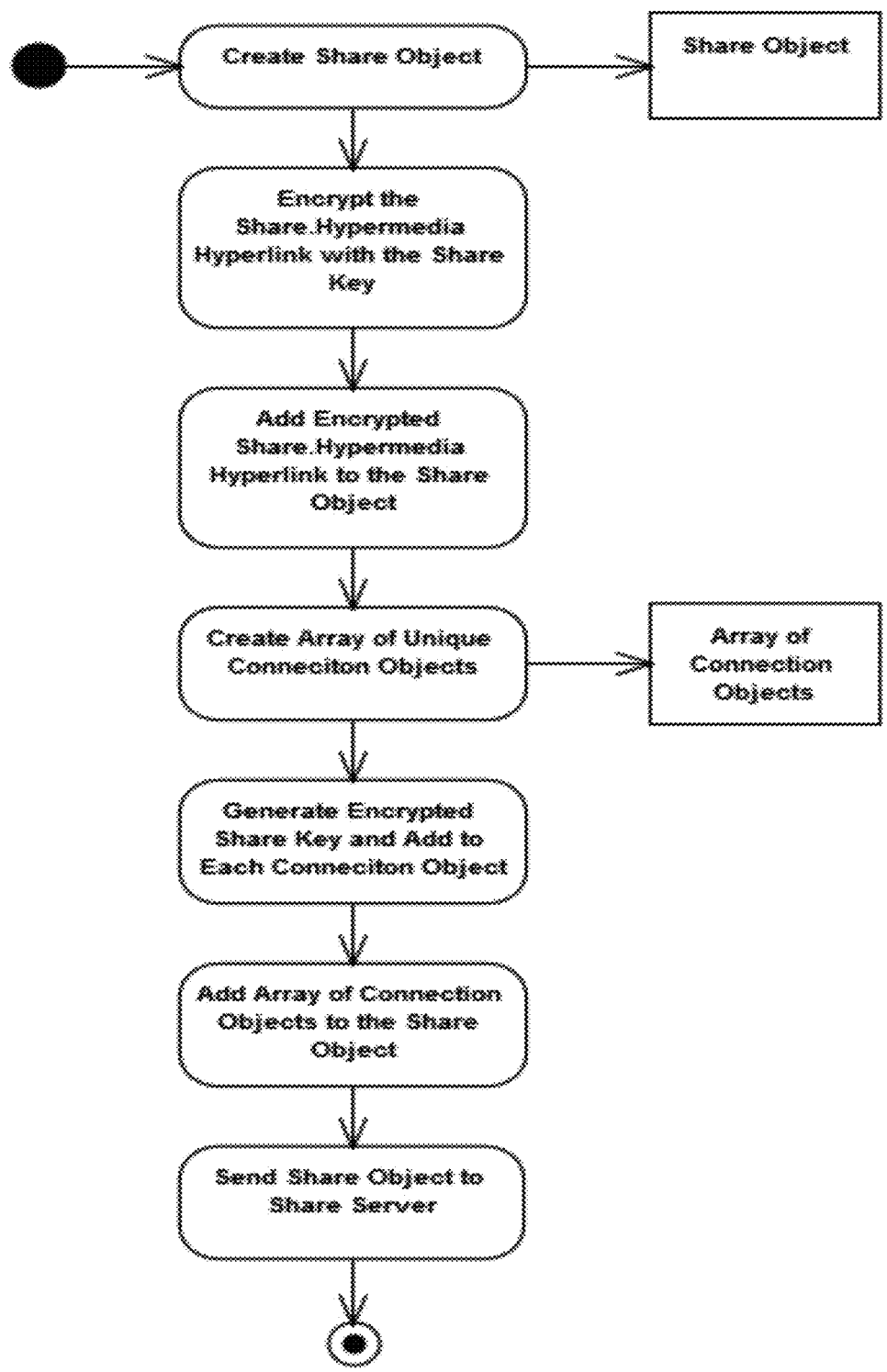
FIG. 6 is a flow diagram that illustrates a send share object to share server method.

Upon a feed refresh, the shared message appears in the connected user's feed. A similar process to the one outlined in FIG. 6 is followed, but in reverse order, by the user application to compose the shared message in the connection's feed.

A method can include each feed object being sent to a connection's device. The feed object comprises a hyperlink to the digital data and that connection's encrypted share key. Using the connection's asymmetric private key, the application decrypts the encrypted share key. The share key is then used to decrypt the hyperlink to the digital data file. The file is then pulled from the user's secure data storage device which hosts the share. The share key is then used to decrypt the digital data file.

The file is then deserialized, and the digital data is loaded into the field members of the feed object. Once the feed object is fully hydrated, the application uses the context and data in the object to draw the UI and display the feed.

Figure 7:
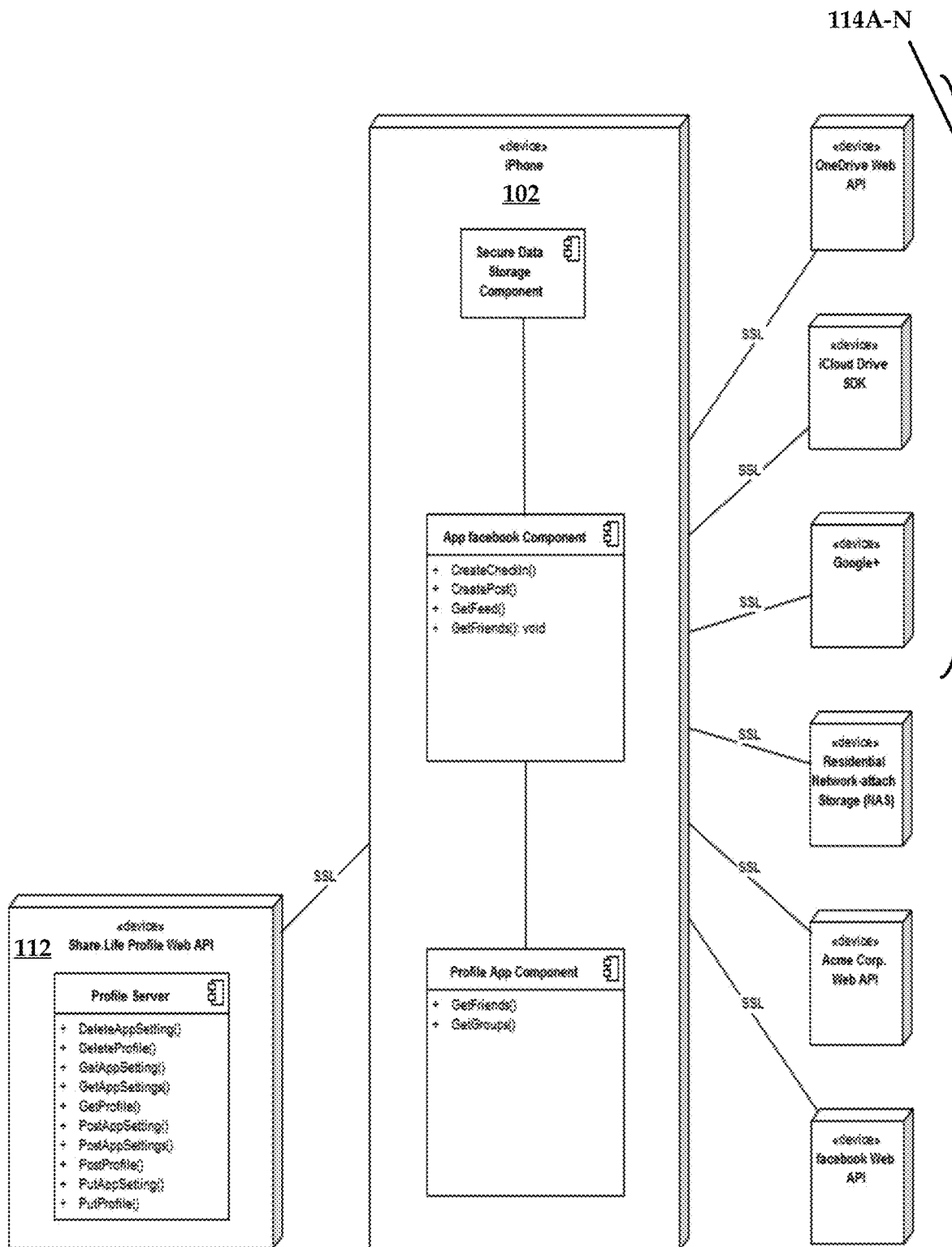
FIG. 7 is another schematic diagram of the example private social network system, being configured to create an aggregate social network.

FIG. 7 illustrates the logical systems architecture of a system that functions as an aggregator of public social media networks. This system can be a particularly purposed configuration of the systems of FIGS. 1 and 2. FIG. 7 depicts the profile web API server 112, the application 102 and secure data storage systems 114A-N. The system is communicatively coupled with a Facebook™ application, and profile application components, as well as several types of secure data storage systems and their relationships. To be sure, while the Facebook™ application has been discussed, the user can link any number of public social media accounts to the aggregator system.

As mentioned previously, systems of the present technology can function as a gateway solution that offers not only a new aggregated and private social media network, but also aggregated access to existing public social media networks such as Facebook™, Instagram™, and Twitter™ with enhanced functionality.

Advantageously, the present technology allows users the possibility to aggregate all of their cloud content/hypermedia and share it on a public media site. For example, users can select content and/or create links to content on their secure data storage devices and then copy the content or the hyperlinks to a Facebook™ post. All of the content is accessible and sharable from one application.

The systems of the present disclosure allow users to control the amount and type of content viewed, who they want to view the content, and where they want the content viewed, without any marketing or filters usually imposed by public social media networks.

For example, users can create groups, put friends in groups, set a default filter to the groups, and then apply the settings to their Facebook™ feeds. Because all settings for posting and viewing feeds are stored off on the profile Web API server 112, users will also have a seamless experience across all their devices.

To be sure, while certain public social network such as Facebook™ are referred to in certain example use cases, it will be understood that the systems and methods of the present technology can be configured to cooperate with any public social media network using, for example, an API provided by the public social media network.

Figure 8:
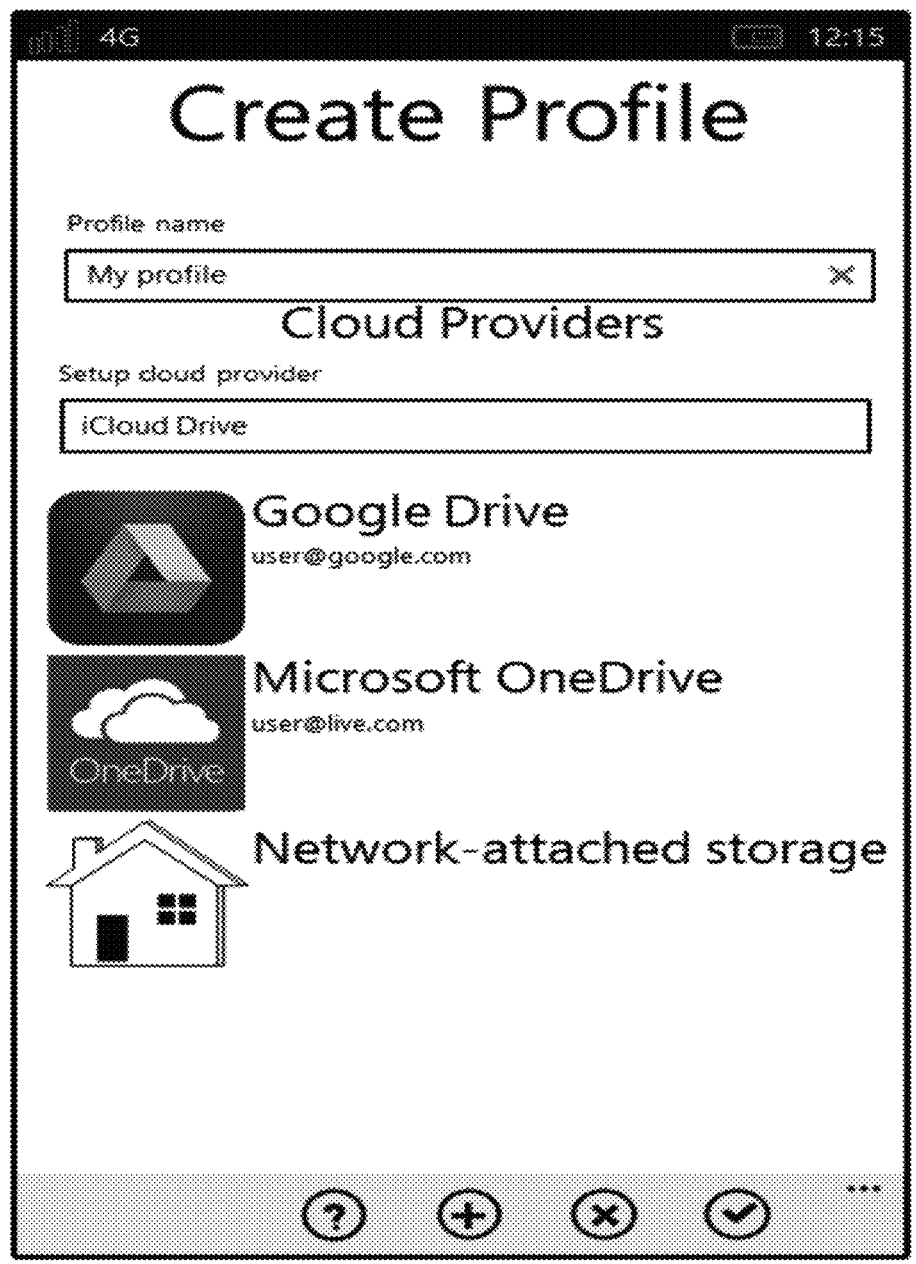
FIGS. 8-15 collectively illustrate various graphical user interfaces that allow a user to interact with the private/aggregate social network system.

FIGS. 8-15 are various graphical user interfaces (GUIs) that collectively illustrate features provided by the present technology. FIG. 8 is a GUI where a user can link one or more private or personal storage devices to the aggregated social network system. The user can select their storage devices/locations during the process of creating a new profile within the system. Again, the aggregated social network is a centralized location where many private storage locations can be linked to provide digital data in shared messages using URL links.

The create profile GUI illustrates how a user creates profiles for each of their cloud providers and/or data storage devices. Each cloud provider represents a cloud drive subscription for the user. Examples include Google Drive™, Google+™, Microsoft OneDrive™, Cloud Drive™, and Apple iCloud Drive™. The user can also select other data storage devices used to store content for sharing, such as local storage or network storage. To create a profile, a user taps the plus button, enters a profile name, and then selects a cloud provider from the set up cloud provider drop-down box. Users are then redirected to the cloud provider login screen. To delete a profile the user selects a cloud provider and clicks the X button.

Advantageously, parents also use this screen of the application to create cloud provider profiles for their children. This enables parents to aggregate, review, and edit all of their children's social media content in the application.

The create profile screen illustrates the Federated Cloud Drive System™ at the application level. The Federated Cloud Drive System™ provides users with complete ownership and control of their content. User content is never stored in the system data center. Thus, it is easy for a user to add and delete without risk of the data living on and/or being hacked.

Figure 9:
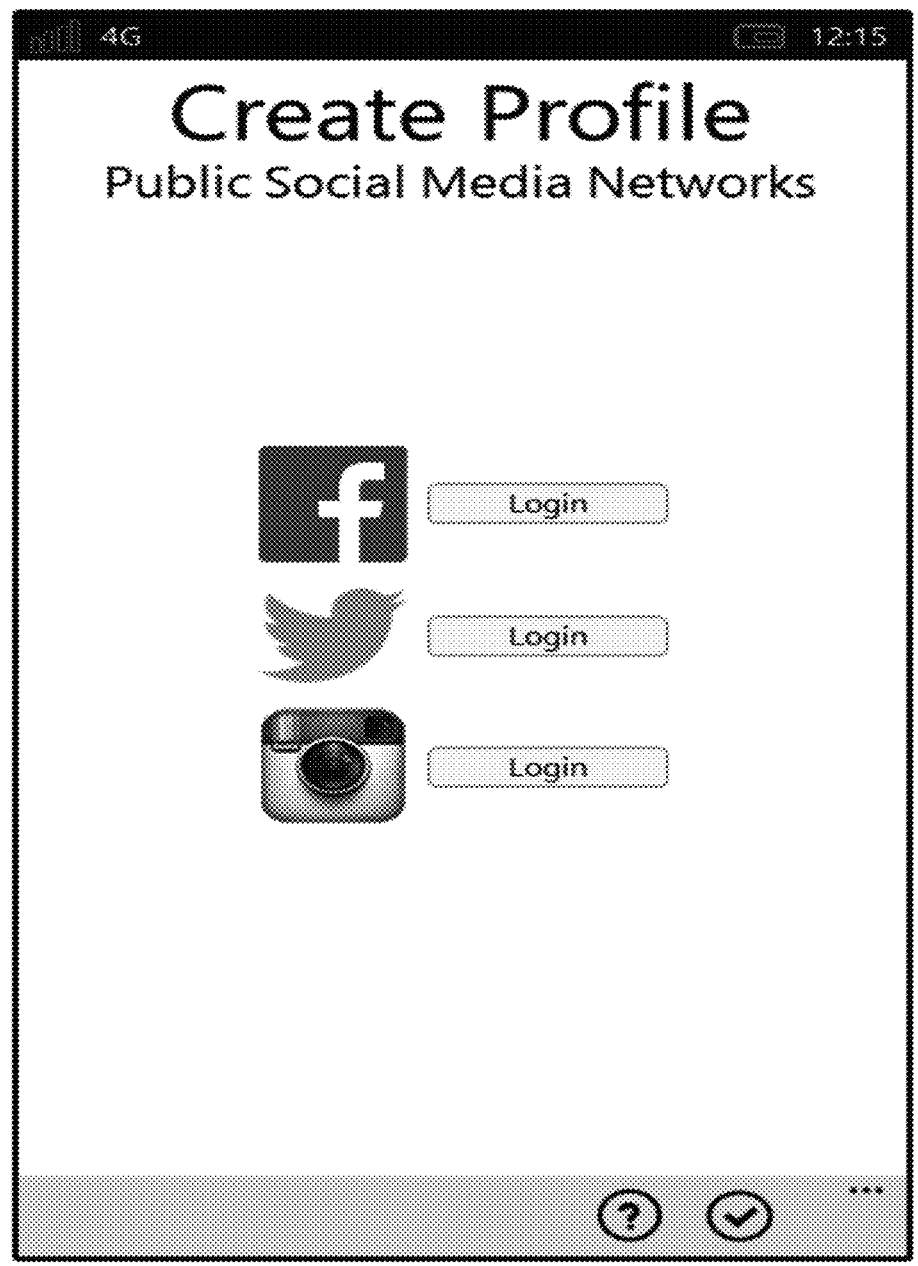

FIG. 9 illustrates a GUI for linking one or more public social networks. The user can login to the individual public social networks, providing their username and/or password. The system can capture the login credentials and store them for later use when the system pulls or pushes messages for the user. The aggregated social network is a private social network because the user's digital data is not stored on the system that provides the aggregated social network. To reiterate, the digital data resides on a private location for the user so that the public social networks never gain access to the digital data files. To be sure, the aggregated social network creates shared messages that comprise hyperlinks to the digital data. Receiving parties, such as recipients of the shared messages, can access the digital data directly on their end user devices, through an application that resides on their local device, or through a client-facing web interface provided by the system.

A user can utilize the GUI of FIG. 9 to login to various public social media sites, such as Facebook, Twitter, and Instagram. The system can aggregate these feeds into a single feed so that you can see your feeds and posts aggregated from multiple public social media networks.

Figure 10:
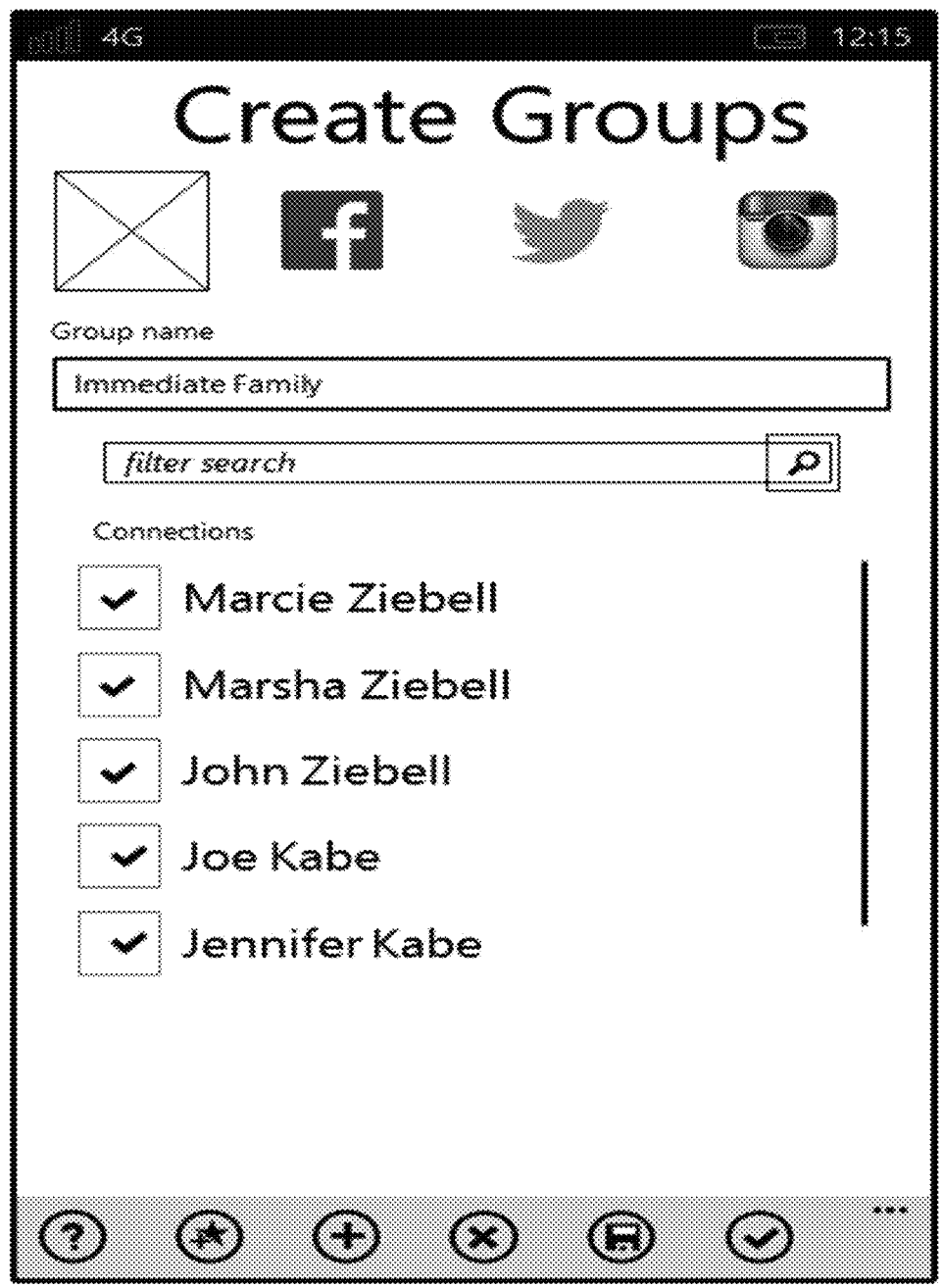

FIG. 10 is a GUI that allows a user to create groups. The user can select the social media network for which they wish to create a group. The user can then create a new group name, for example "Immediate Family". The system can search for connections by name within the aggregate social network. A scroll box of names will then appear with check boxes next to the recipients names used to add them to the new group.

Figure 11:
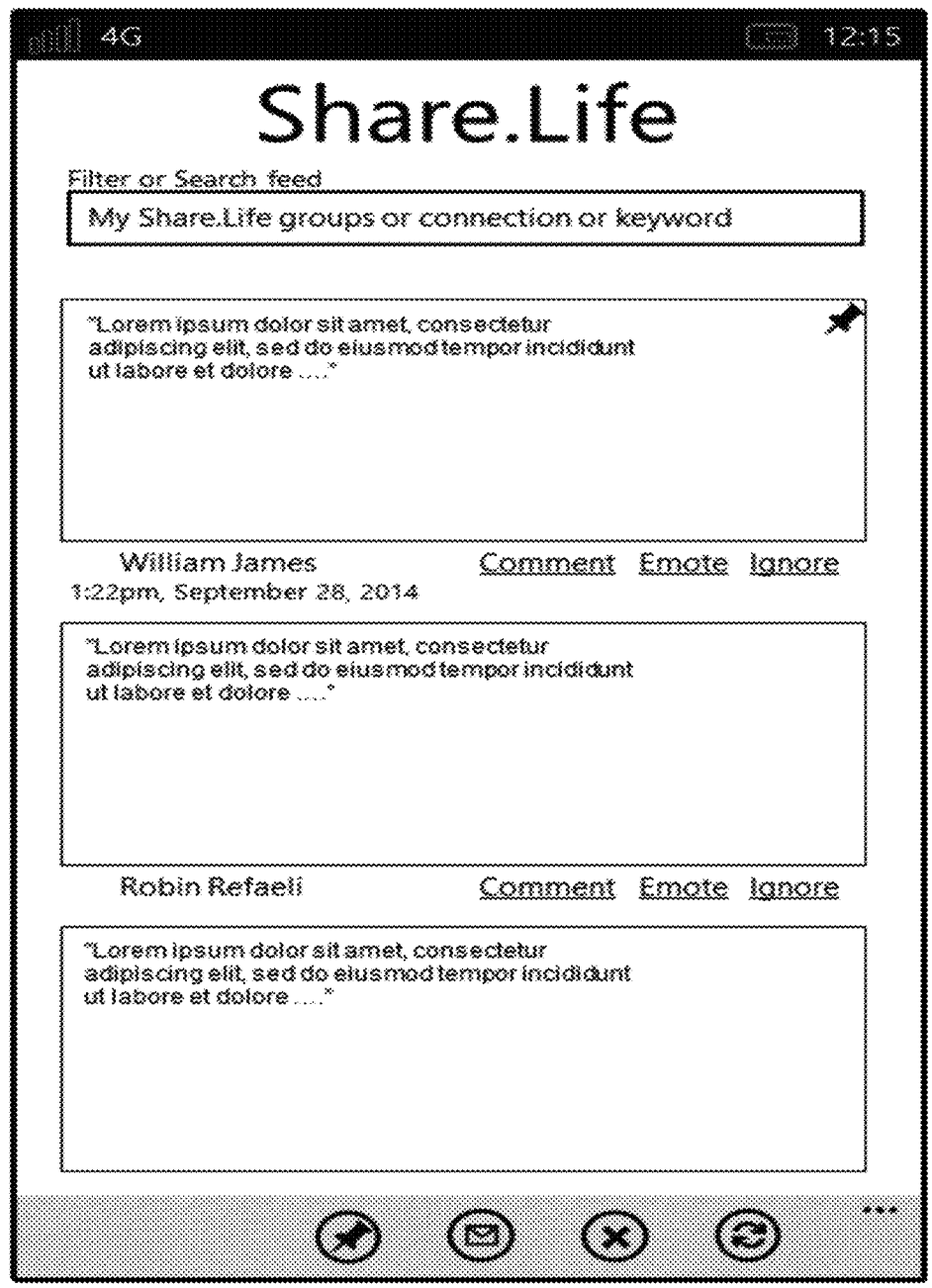

FIG. 11 is a GUI that illustrates a homepage that is a page-based (iOS) or hub (Windows) user interface. The homepage is designed so that the user can swipe left to right to cycle through their private social media network feed as well as the feeds of public social media networks such as Facebook, Instagram or Twitter.

The private social media network feed screen enables the user to select a group or key words to filter their feeds. The user can also use the thumbtack button to pin a feed to the top of their feed list. The thumbtack icon in the top feed illustrates feed pinning. A user can comment, emote or ignore each feed by selecting the appropriate link. The comment option opens up the comments to that specific feed and allows the user to add their own comments. The emote option enables a user to add an emoticon to the feed. The ignore option enables a user to mark a specific feed as "ignored" so that it does not appear in the feed list any longer. Users can add new shares or delete existing shares by clicking the add or delete button respectively. The refresh button can be used to refresh the feed. The ellipsis button enables users to access advanced settings such as connection (e.g. add or delete to existing shares), group, sort, and feed configuration (e.g. how much data a user wants cached locally on their device), as well as account management.

The private social media network feed screen illustrates how users now can create a highly personalized social media experience with a level of ownership, security, control, and monitoring not currently available with public social media networks.

Figure 12:

FIG. 12 illustrates a Facebook feed screen within a public social media network feed. The feed screen enables the user to select a group, friend, or keyword to filter their feed without any of the marketing or filters normally imposed by Facebook. Thus, the public social network feed is imported into the private social network system.

The user can also use the thumbtack button to pin a feed to the top of their feed list. The thumbtack icon in the top feed illustrates feed pinning. A user can like or comment on each feed by selecting the appropriate link. The comment option opens up the comments to that specific feed and allows the user to add their own comments. The like option enables a user to like a feed. Users can add or delete posts by clicking the add or delete button respectively. The refresh button is used to refresh the feed. The ellipsis button enables users to access advanced settings such as friend, group, sort, and feed configuration (e.g. how much data a user wants cached locally on their device which can significantly reduce wait time vs. a traditional Facebook feed), as well as, account management.

The Facebook feed screen illustrates how users can now access, manage, monitor, and even personalize their public social media networks all in one place—without any marketing.

Figure 13:
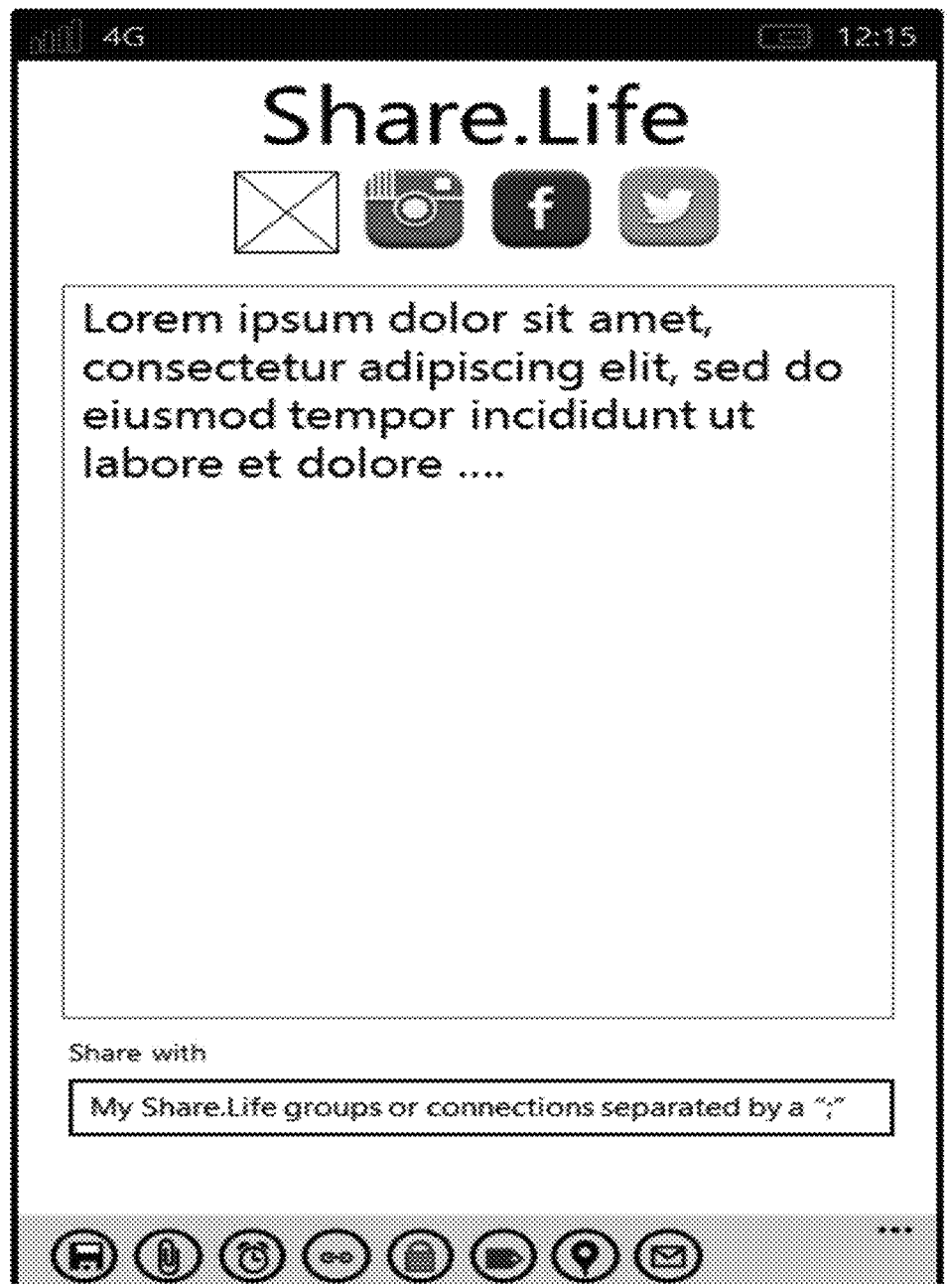

FIG. 13 is a GUI in the form of a share screen that illustrates how a user can send a post to any of their public social media networks. The user first selects the badge of the desired social network and then enters the desired text or emoticon into the text box. When posting to a public social media network, the sharing functionality (e.g. what kind of content can be posted, who it is posted to, how the content is transmitted) is limited to and governed by the public social media network selected.

When posting to the private social media network, new sharing functionality and controls are available. The user picks the individuals or groups they wish to share their post with. Any file type stored on a user's cloud drive can be selected and attached. The user can decide to tag connections and locations to the post by clicking on the geolocation or tag button. If the share contains sensitive material, the user can click the private/"for your eyes only" button. The user can set share rights (read, write, download, and/or invite others to the share). Should the user deem it useful, they can also choose extra encryption for their share, so that it is not only encrypted while in transit (the default for all shares), it is also encrypted while at rest. Additionally, the user can decide to save the post by clicking the save button, so that they can come back to the post and share it at a later time. Finally, they can set a time to live that sets a countdown clock until the share is no longer available. Upon completion of the post, the user then clicks the send button, and the post is shared to the desired individuals or group(s).

Again, the systems of the present technology function as a gateway solution where users can share on any of their public social media networks all from one application/service, and if they choose to share on the private social media network they can: (1) control who they share with; (2) they can share more types of content; (3) they maintain ownership of that content; (4) they can make the share as private and secure as they want; (5) they can tag or geolocate as desire; (6) they can set an expiration for the share, and (7) they can save for later. The enhanced ownership, control, and security are all unique to the private social networks of the present technology.

Figure 14:
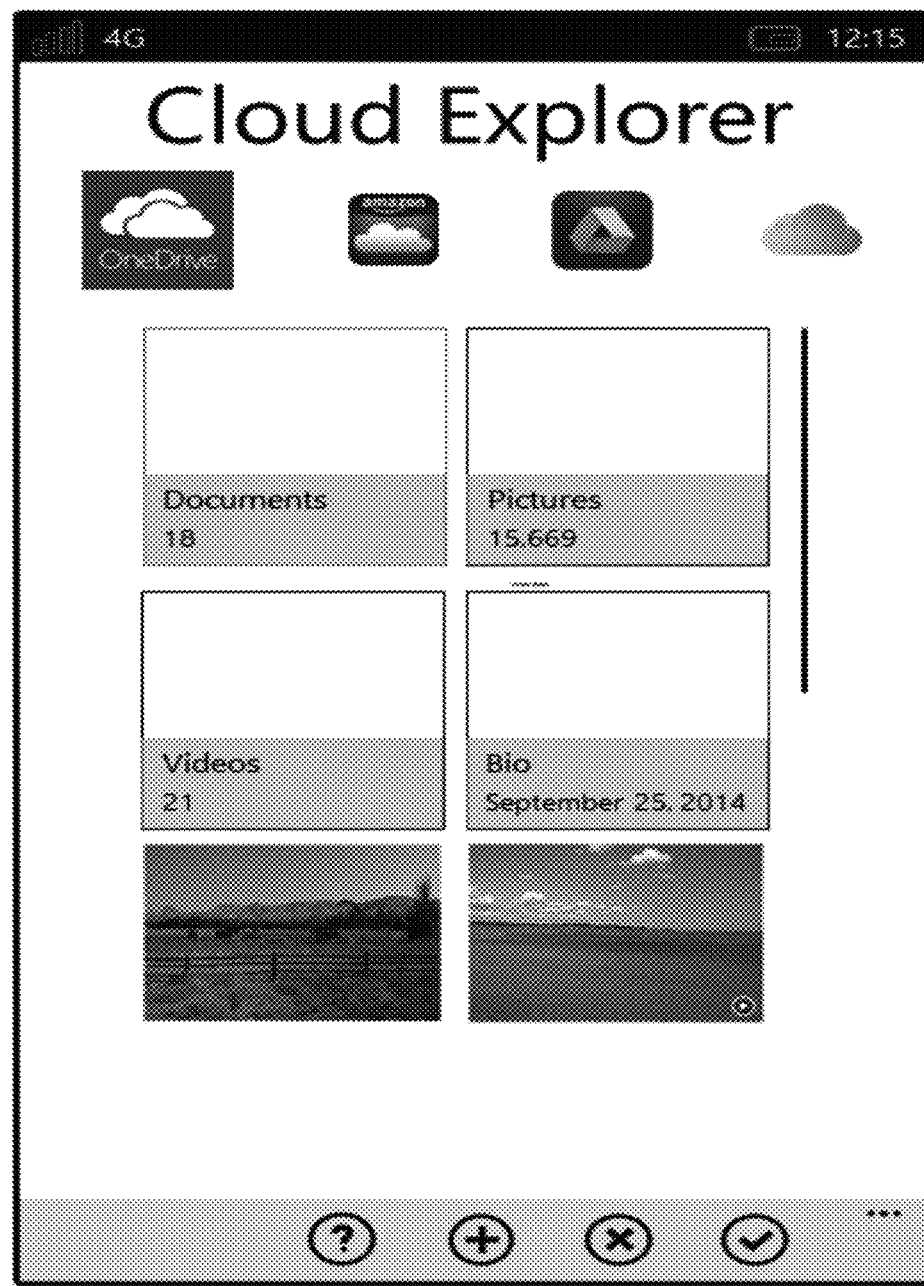

FIG. 14 is a GUI of a cloud explorer screen that allows users to view and have access to all their cloud storage providers and data storage options from within one application. Users can navigate between drives by selecting the appropriate icon for the drive that they want to view. Working like a file system, users will be able to browse through their folders, create new folders, view their data (documents, images, videos, anything they have stored), and select data to be included in a shared message.

Users will also be able to manage all their data from the private social network application. This includes uploading, reading, editing, and deleting their stored data, as well as transferring data across storage provider platforms, giving users more options to manage and control their data. For example, if a user is running short on disk space on one cloud or storage drive, they can move data over to another cloud or storage drive.

FIG. 14 illustrates how users can now access, create, read, delete, and transfer data across multiple storage drives from one convenient view, as well as share it easily on public social media networks and/or securely on the private social media network.

Figure 15:

FIG. 15 is a GUI that allows a user to manage not only their public social media network accounts, but their children's (or another third party) as well. The groups menu option at the bottom of the screen enables a user to configure groups for public social media network accounts (i.e. create groups and add their friends, followers or connections into groups). These groups can then be used to filter public social media network feeds. The feeds menu option enables users to configure feeds. Users can assign a default group and complex sort order to a public social media network feed. Settings menu option provides users with an array of settings to customize the aggregation of their public social media network accounts. For example, users can specify how many posts or feeds to retrieve at a time or default posting privacy levels such as friends of friends, public or private. The user clicks the check button to return to the previous screen of the application.

Figure 16:
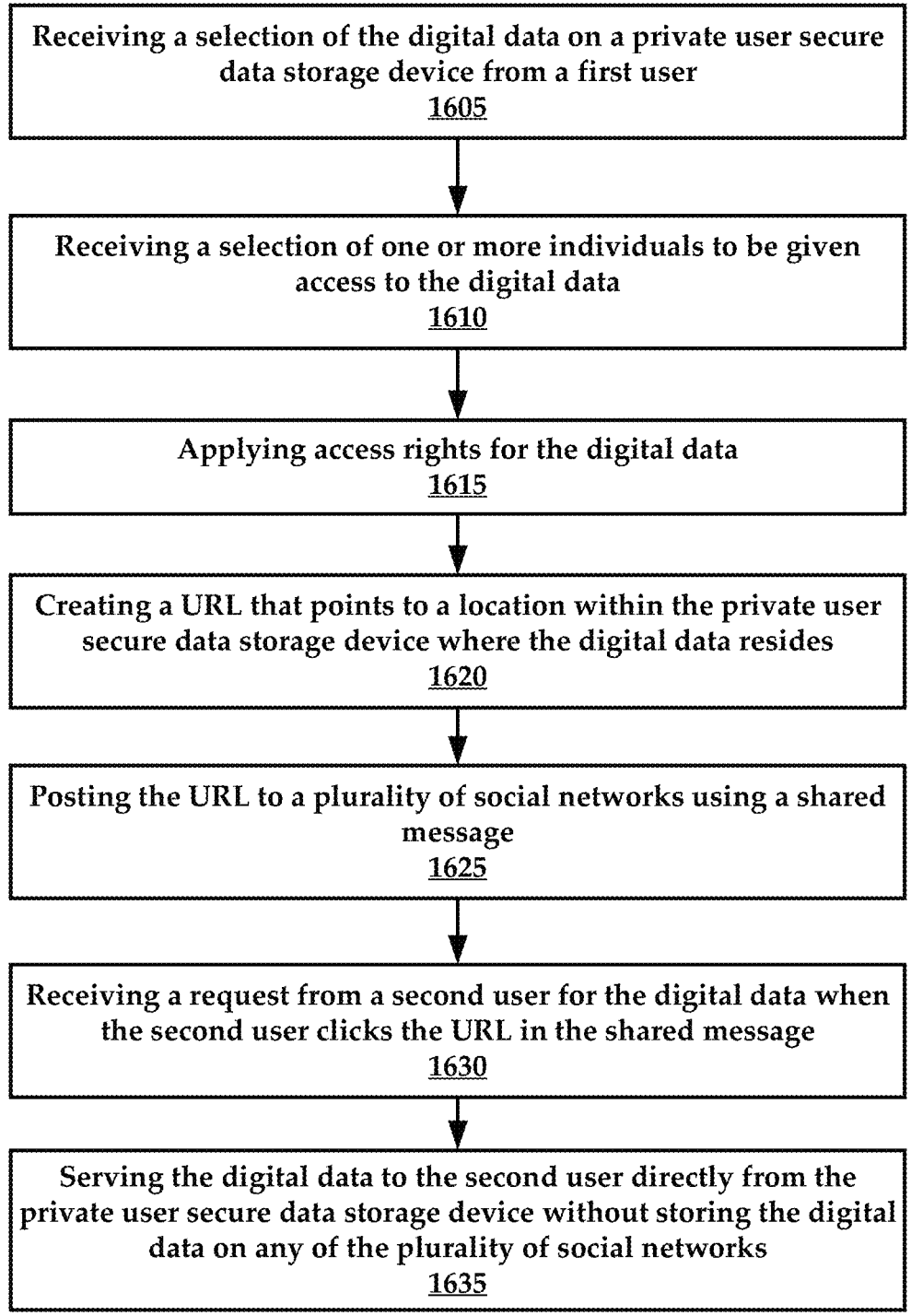
FIG. 16 is a flowchart of an example method that allows a user to provide access to their digital data in such a way that the recipients receive a URL to retrieve the digital data. The URL is provided in a shared message that is posted to a private social network or pushed to one or more public social networks.

Referring now to FIG. 16, a method is illustrated in a flowchart format. The method involves the storage of digital data, such as a document, image, video, or other electronic file in a private user secure data storage device. This storage space can include user's private device such as a mobile phone and/or private server. In other embodiments, the private user secure data storage device could comprise a cloud based storage space that is dedicated to the user. For example, a user can be provided with a personal storage space within a cloud service such as Dropbox™.

The method can include receiving 1605 a selection of the digital data on a private user secure data storage device from a first user. For example, the user (digital content owner) can select a video that they want to share with other users.

Next, the method can include receiving 1610 a selection of one or more individuals to be given access to the digital data. For example, the user can specify contacts of one or more social networks or other contacts with which they would like to share the selected digital data.

In an optional step, the user can select any desired access rights for the digital data that will affect the rights or access to the digital content. For example, the user can specify that the contacts/users can download and view the digital data, but not delete or modify the digital data. Thus, the method can include applying 1615 access rights for the digital data. To be sure, the user can set these access rights because they own the digital data and the digital data is stored in a private user secure data storage device. The user can access and control the digital data as they desire.

In some embodiments, the method can include creating 1620 a URL that points to a location within the private user secure data storage device where the digital data resides. The URL is a hyperlink pointer that when clicked by another user will launch a browser that accesses the location where the digital data resides.

According to some embodiments, the method can include posting 1625 the URL to a plurality of social networks. As mentioned above, access to the plurality of social networks can be aggregated within a single application or UI by the user. The user can create a single post or message that is pushed to each of the plurality of social networks from this centralized UI. In one embodiment, the message can be posted on an aggregated social network or federated social network that bilaterally communicates with the plurality of social networks specified by the user. Thus, the user creates one message and that message is shared and proliferated through the plurality of social networks.

Next, the method includes receiving 1630 a request from a second user for the digital data when the second user clicks the URL. For example, the second user is a contact that was selected by the user prior to sharing the URL on the aggregated social network or any of the plurality of social networks where the message is pushed. The request can occur when the second user clicks the URL, which launches a browser on their local device (or within an application that resides on the local device).

In some embodiments, the method can comprise serving 1635 the digital data to the second user directly from the private user secure data storage device without storing the digital data on any of the plurality of social networks. Thus, while the second user receives the message comprising the URL in their social network feed, the digital data is served out-of-band with respect to their social network that serves the social network feed. This prevents the social network from gaining access to the digital data, while allowing the second user to access the digital data.

The process of serving the digital data can occur, for example, when the private user secure data storage device provides access to the digital data or when the aggregated social network obtains the digital data from the private user secure data storage device.

To be sure, the methods described herein can include additional or fewer steps than those illustrated in the flowcharts provided above.

As used herein, the term "engine", "system", "client", "module", "controller", or "application" may also refer to any of an application-specific integrated circuit ("ASIC"), an electronic circuit, a processor (shared, dedicated, or group) that executes one or more software or firmware programs, a combinational logic circuit, and/or other suitable components that provide the described functionality.

Figure 17:
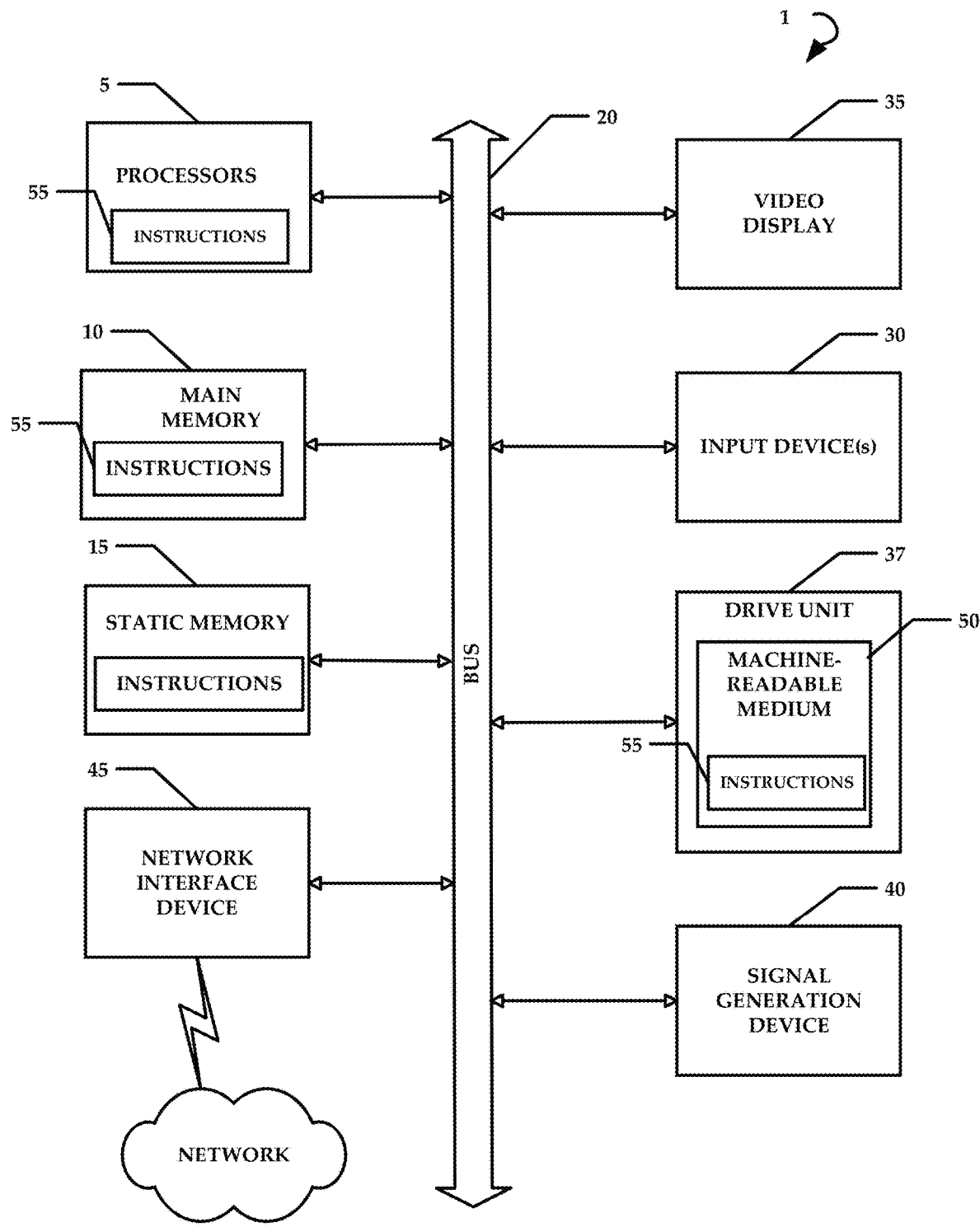
FIG. 17 is a schematic diagram of an example computing machine that can be utilized to practice aspects of the present disclosure.

FIG. 17 is a diagrammatic representation of an example machine in the form of a computer system 1, within which a set of instructions for causing the machine to perform any one or more of the methodologies discussed herein may be executed. In various example embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a robotic construction marking device, a base station, a personal computer (PC), a tablet PC, a set-top box (STB), a personal digital assistant (PDA), a cellular telephone, a portable music player (e.g., a portable hard drive audio device such as an Moving Picture Experts Group Audio Layer 3 (MP3) player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1 includes a processor or multiple processors 5 (e.g., a central processing unit (CPU), a graphics processing unit (GPU), or both), and a main memory 10 and static memory 15, which communicate with each other via a bus 20. The computer system 1 may further include a video display 35 (e.g., a liquid crystal display (LCD)). The computer system 1 may also include an alphanumeric input device(s) 30 (e.g., a keyboard), a cursor control device (e.g., a mouse), a voice recognition or biometric verification unit (not shown), a drive unit 37 (also referred to as disk drive unit), a signal generation device 40 (e.g., a speaker), and a network interface device 45. The computer system 1 may further include a data encryption module (not shown) to encrypt data.

The drive unit 37 includes a computer or machine-readable medium 50 on which is stored one or more sets of instructions and data structures (e.g., instructions 55) embodying or utilizing any one or more of the methodologies or functions described herein. The instructions 55 may also reside, completely or at least partially, within the main memory 10 and/or within the processors 5 during execution thereof by the computer system 1. The main memory 10 and the processors 5 may also constitute machine-readable media.

The instructions 55 may further be transmitted or received over a network via the network interface device 45 utilizing any one of a number of well-known transfer protocols (e.g., Hyper Text Transfer Protocol (HTTP)). While the machine-readable medium 50 is shown in an example embodiment to be a single medium, the term "computer-readable medium" should be taken to include a single medium or multiple media (e.g., a centralized or distributed database and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media, and carrier wave signals. Such media may also include, without limitation, hard disks, floppy disks, flash memory cards, digital video disks, random access memory (RAM), read only memory (ROM), and the like. The example embodiments described herein may be implemented in an operating environment comprising software installed on a computer, in hardware, or in a combination of software and hardware.

Not all components of the computer system 1 are required and thus portions of the computer system 1 can be removed if not needed, such as Input/Output (I/O) devices (e.g., input device(s) 30). One skilled in the art will recognize that the Internet service may be configured to provide Internet access to one or more computing devices that are coupled to the Internet service, and that the computing devices may include one or more processors, buses, memory devices, display devices, input/output devices, and the like. Furthermore, those skilled in the art may appreciate that the Internet service may be coupled to one or more databases, repositories, servers, and the like, which may be utilized in order to implement any of the embodiments of the disclosure as described herein.

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the present technology in the form disclosed. Many modifications and variations will be apparent to those of ordinary skill in the art without departing from the scope and spirit of the present technology. Exemplary embodiments were chosen and described in order to best explain the principles of the present technology and its practical application, and to enable others of ordinary skill in the art to understand the present technology for various embodiments with various modifications as are suited to the particular use contemplated.

Aspects of the present technology are described above with reference to flowchart illustrations and/or block diagrams of methods, apparatus (systems) and computer program products according to embodiments of the present technology. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the following description, for purposes of explanation and not limitation, specific details are set forth, such as particular embodiments, procedures, techniques, etc. in order to provide a thorough understanding of the present invention. However, it will be apparent to one skilled in the art that the present invention may be practiced in other embodiments that depart from these specific details.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

Also, some embodiments may be described in terms of "means for" performing a task or set of tasks. It will be understood that a "means for" may be expressed herein in terms of a structure, such as a processor, a memory, an I/O device such as a camera, or combinations thereof. Alternatively, the "means for" may include an algorithm that is descriptive of a function or method step, while in yet other embodiments the "means for" is expressed in terms of a mathematical formula, prose, or as a flow chart or signal diagram.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

If any disclosures are incorporated herein by reference and such incorporated disclosures conflict in part and/or in whole with the present disclosure, then to the extent of conflict, and/or broader disclosure, and/or broader definition of terms, the present disclosure controls. If such incorporated disclosures conflict in part and/or in whole with one another, then to the extent of conflict, the later-dated disclosure controls.

The terminology used herein can imply direct or indirect, full or partial, temporary or permanent, immediate or delayed, synchronous or asynchronous, action or inaction. For example, when an element is referred to as being "on," "connected" or "coupled" to another element, then the element can be directly on, connected or coupled to the other element and/or intervening elements may be present, including indirect and/or direct variants. In contrast, when an element is referred to as being "directly connected" or "directly coupled" to another element, there are no intervening elements present. The description herein is illustrative and not restrictive. Many variations of the technology will become apparent to those of skill in the art upon review of this disclosure.

While various embodiments have been described above, it should be understood that they have been presented by way of example only, and not limitation. The descriptions are not intended to limit the scope of the invention to the particular forms set forth herein. To the contrary, the present descriptions are intended to cover such alternatives, modifications, and equivalents as may be included within the spirit and scope of the invention as defined by the appended claims and otherwise appreciated by one of ordinary skill in the art. Thus, the breadth and scope of a preferred embodiment should not be limited by any of the above-described exemplary embodiments.

What is claimed is:

1. A method for adding share data for a shared message by an application on a user's device, which is performed by a processor executing instructions stored in memory, the method comprising:

receiving user selections of multiple connections individually and by adding connections by selecting multiple groups to add designated viewers to the share data for a shared message, and the application generating a unique set of connections when the user selects a connection and the selected connection is also in a selected group or when the selected connection is multiple selected groups;

allowing the user to add emoticons in addition to text to the share data for the shared message;

allowing the user to add file content from the user's cloud drive to the share data for the shared message and the application providing edit, copy, delete, and move file functionality to enable the user to manage the user's cloud drive files;

allowing the user to add tags of connections to the share data for the shared message, and the application tagging functionality illustrating a connection's profile picture in addition to their profile name enabled by accessing the connection's profile hypermedia on the connection's cloud drive; and allowing the user to add geolocation to the share data for the shared message by utilizing the application functionality to display a mapping screen for users to drop a pin on the designated location.

2. The method according to claim 1, further comprising providing an ignore option that enables the user to mark a portion of the share data as ignored.

3. The method according to claim 1, further comprising providing an account link user interface that allows the user to link a plurality of private cloud storage accounts.

4. The method according to claim 1, further comprising providing an account login user interface that allows the user to log into a plurality of social network accounts for the user.

5. The method according to claim 4, further comprising aggregating feeds for the plurality of social network accounts for the user into an aggregated social network.

6. The method according to claim 5, further comprising creating a URL for digital data owned by the user, the digital data being stored on at least one of the plurality of private cloud storage accounts.

* * * * *